United States Patent [19]

Zelczer et al.

[11] Patent Number: 4,848,654
[45] Date of Patent: Jul. 18, 1989

[54] ZONE CONTROL AND SMOKE DAMPING APPARATUS FOR CENTRAL HEATING AND/OR COOLING SYSTEMS

[76] Inventors: Alex Zelczer; Ruth Zelczer, both of 3840 Severn Rd., Cleveland Heights, Ohio 44118

[21] Appl. No.: 112,814

[22] Filed: Oct. 23, 1987

Related U.S. Application Data

[60] Continuation-in-part of Ser. No. 17,849, Feb. 24, 1987, Pat. No. 4,702,412, which is a division of Ser. No. 896,941, Aug. 15, 1986, abandoned.

[51] Int. Cl.[4] .............................................. F24F 13/08
[52] U.S. Cl. ...................................... 236/49.4; 165/22
[58] Field of Search ................. 236/49 A, 49 C; 98/1; 165/22; 137/495

[56] References Cited

U.S. PATENT DOCUMENTS

4,189,092  2/1980  Maxson et al. ............... 236/49 C X
4,301,831  11/1981  Lord ............................ 137/495 X
4,463,896  8/1984  Schaus ......................... 236/49 A
4,545,524  10/1985  Zelczer ...................... 236/49 C X Primary Examiner—William E. Tapolcai
Attorney, Agent, or Firm—Renner, Otto, Boisselle & Sklar

[57] ABSTRACT

An improved zone control apparatus having mode selectors which allow a user to select any one of a variety of operating modes for individual fluidically actuated flow control devices. The invention further provides for a smoke damper which upon automatic or manual activation causes all of the flow control devices to restrict flow of conditioned fluid through respective ducts or pipes so as to help minimize smoke contamination and the formation of a "chimney" effect. The invention further provides for the utilization of vibration type diaphragm pumps to create a source of pressure and vacuum, a pressure test device to quickly check the pressure in the apparatus, and a flow indicator for determining the location of leaks in the apparatus.

15 Claims, 3 Drawing Sheets

ZONE CONTROL AND SMOKE DAMPING APPARATUS FOR CENTRAL HEATING AND/OR COOLING SYSTEMS

RELATED APPLICATION DATA

This application is a continuation-in-part of co-pending application Ser. No. 017,849, filed Feb. 24, 1987, now U.S. Pat. No. 4,702,412, which is a division of abandoned application Ser. No. 896,941, filed Aug. 15, 1986. Said co-pending and abandoned applications are hereby incorporated herein by reference.

DISCLOSURE

This application relates generally to central heating and/or cooling systems for residential and commercial installations. More particularly, this invention relates to certain improvements in zone control apparatus utilized in conjunction with such systems and, in particular, zone control apparatus of the type disclosed in U.S. Pat. No. 4,545,524, which is hereby incorporated herein by reference. This application also relates to a smoke damping system for preventing the spread of smoke throughout the ductwork of an HVAC system.

BACKGROUND

Central heating and/or cooling systems typically employ a central fluid heating and/or cooling plant and respective conduits for directing the heated or cooled fluid to the rooms, offices, etc. in the house, unit or commercial building being serviced by the system. In forced air systems, a furnace and/or air conditioner is employed to heat or cool air which is forced through air ducts to the various rooms. In forced water systems, a water heater and/or cooler is employed to heat or cool water which is pumped through pipes to heat exchangers located in the various rooms. Steam heating systems are akin to hot water systems except that a boiler is employed to generate steam which is directed by pipes to radiators located in the various rooms.

In such systems, a single thermostat located in one of the heated or cooled rooms may be employed to control the operation of the system. The thermostat usually is set to the desired room temperature whereupon the system operates automatically to maintain such temperature in the room containing the thermostat. At the same time, the other rooms, offices, etc. being serviced will be heated or cooled, but without provision for automatic individual temperature control.

In houses, other residential units and commercial buildings employing such systems, the various rooms thereof typically are heated or cooled both day and night. Consequently, rooms (or zones consisting of one or more rooms or areas) are heated or cooled during daily periods of minimal or no use. For example, the bedrooms in a house continue to be heated or cooled during the daytime when most activity occurs in the non-sleeping areas of the house such as the living room, dining room and kitchen, whereas the latter areas continue to be heated or cooled along with the bedrooms at night. In commercial buildings, unused offices or other daytime use rooms may continue to be heated just to maintain a comfortable environment in localized maintenance and/or security areas or rooms. Obviously, the heating or cooling of a room or zone not in use or having minimal use for a substantial portion of the day is of minimal benefit and a waste of energy.

In view of the foregoing, considerable energy savings could be obtained with minimal compromise in comfort by eliminating unnecessary heating or cooling of rooms during cyclical or daily periods of low or no use on a room-by-room or zone-by-zone basis. Although individual control of room heating or cooling may to some extent be obtained by going from room to room and opening or closing the air vents in the case of forced air systems or heat exchanger valves in the case of water or steam systems, such practice is tedious, subject to forgetfulness or tardiness, and overall inconvenient. Also, loose or poorly fitting closures for the air vents would reduce potential savings. This practice of course is contingent upon each room or zone having a shut-off device. Moreover, there is no provision for preheating a room or zone prior to use absent advance manual attention thereto.

RELATED U.S. PAT. NO. 4,545,524

In U.S. Pat. No. 4,545,524, there is disclosed a zone control apparatus for central heating and/or cooling systems having a central fluid heating and/or cooling plant and respective conduits for directing the heated or cooled fluid to individual rooms in a house or other building being serviced by the system. The zone control apparatus operates automatically to eliminate unnecessary heating of individual rooms to zones consisting of one or many rooms during cyclical periods of low or no use whereby substantial energy savings may be obtained with minimal compromise in comfort. More particularly, the zone control apparatus operates on the system to isolate or separate, for example, daytime and nighttime use areas of the house for selective heating or cooling only during their respective daytime or nighttime use or anticipated use periods.

The zone control apparatus disclosed compromises one or more flow control devices operatively associated with respective fluid conduits in the central heating and/or cooling system, and a cycle controller for cycling the flow control device or devices between high and low (or no) flow conditions at times strategically selected to correspond to periods of high and low use of the room or rooms with which the flow control device or devices are respectively associated. When in its low flow condition, each flow control device preferably closes off fluid flow through the associated conduit to eliminate direct heating or cooling of the associated room or, in the alternative, substantially restricts flow to permit nominal flow and nominal direct heating or cooling of the associated zone. As is contemplated, flow control devices associated with rooms having generally corresponding periods of high and low use such as during the day or night may be strategically grouped as a zone and together cycled by the cycle controller. As is preferred, the devices are cycled to their high flow condition prior to anticipated usage of the associated rooms by an amount of time sufficient to bring such rooms to desired temperature for comfortable change-over between day area and night area service. Provision also may be made for selective inclusion or exclusion of any room in a given programmed cycle for heating or cooling, or for shut-off of any one or most rooms or zones.

As further disclosed in said patent, the zone control apparatus may employ a variety of flow control devices including fluid actuated devices such as pneumatically operated dampers, valves, and preferably bladders. Bladder type flow control devices, which are moderately priced, reliable, and relatively easy to install, are strategically located in the piping or duct work which forms the passageways through which conditioned fluid passes. In the vast majority of cases, the conditioned fluid comprises heated and/or cooled air, water, or steam flowing through conduits such as pipes, sheet metal ducts, etc. When the bladders are inflated they block the passageway and thus restrict flow of conditioned fluid through the conduit. Conversely, when the bladders are deflated they provide no or limited obstruction to flow of conditioned fluid through the conduit. To inflate and deflate the bladders, valves may be employed selectively to connect the bladders, for example, to an air pressure source for inflation and, for deflation, to pressure relief means such as a vent to atmosphere or a vacuum source.

Overall the apparatus of said patent may be inexpensive and easily installed in new or existing heating and cooling systems. Along with substantial energy savings, the apparatus allows the usage of substantially smaller heating and/or cooling plants, extends the life of wear components in such plants, and allows reduced fan speeds in forced air systems. As a further advantage, a single zone control apparatus according to the invention may operate year round to provide both heating and cooling savings in respective operational modes of dual purpose heating and cooling systems.

SUMMARY OF THE INVENTION

The present invention provides various improvements in zone control apparatus used in conjunction with central heating and/or cooling systems having a control fluid heating and/or cooling plant and respective conduits for directing the heated or cooled fluid to individual rooms in a house or other building being serviced by the system. More particularly, the improvements of the invention relate to zone control apparatus including one or more fluidically actuated flow control devices operatively associated with respective conditioned fluid conduits in the central heating and/or cooling system to permit or restrict flow of conditioned fluid through such conditioned fluid conduits when actuated to a high or low flow condition, respectively.

According to one aspect of the invention, mode selectors preferably included in a logic module allow the user of the apparatus to select any one of a variety of operating modes for each flow control device which preferably includes a bladder disposed within the conditioned fluid conduit for inflation by pressurized air to a low flow condition preferably closing the conditioned fluid conduit and deflation by vacuum to a high flow condition preferably providing only minimal or no obstruction of flow through the conditioned fluid conduit. In relation to such preferred form of flow control device, the variety of operating modes may include, for example, a "first automatic" mode which causes a flow control bladder to follow a first predetermined inflation and deflation schedule such as a day cycle schedule; an "off" mode which causes the bladder to inflate and inhibit the flow of conditioned fluid through the respective conduit, and an "on" mode which causes the bladder to deflate thus allowing essentially unrestricted flow of conditioned fluid. Additionally, there may be provided a "second automatic" mode which causes the bladders to follow a second predetermined inflation and deflation schedule such as a night cycle schedule.

Also, according to the present invention, the pressure and vacuum used for purposes of inflating and deflating the bladders is supplied by vibration type diaphragm pumps. Vibration pumps are relatively inexpensive, essentially maintenance free, require minimum space and power, and produce minimal amounts of noise.

The invention further provides a method and means for creating a smoke damper in connection with central heating and/or cooling systems of forced air type. The smoke damper is operative to actuate the flow control devices to their low flow conditions in response to a sensed condition such as the existence of smoke or abnormally high temperature in a room of the building being serviced by the system. Accordingly, the smoke damper, which may be actuated automatically or manually, operates to prevent the spread of smoke throughout a commercial building or residence and also helps to avoid the formation of a "chimney" effect within conditioned fluid conduits, i.e., air ducts, of the burning structure. In a fire, smoke inhalation, choking by smoke, falling due to smoke, and temporary blinding by smoke, cause a greater number of deaths than the actual burning of persons to death by the fire. Fires, smoldering fires, and subsequent smoke usually start at locations and rooms other than those that are presently occupied in the building. The smoke may then spread into other areas and rooms by way of heating and/or cooling system air ducts long before the fire is able to penetrate such other areas. The smoke damper feature of the present invention helps to prevent or slow down the spread of smoke and thus may provide the extra time needed by the occupants to escape the building before being overcome by smoke.

According to still another aspect of the invention, a method and apparatus are provided for blocking leakage from water and steam lines in response to a sensed condition.

The invention further provides for a simple and relatively inexpensive flow detection device which may be spliced into the vacuum and/or pressure lines leading to the fluid actuated flow control devices. Such detection device provides a clear indication of the flow of air or fluid in the supply lines of the apparatus for diagnostic and testing purposes, excessive flow time signalling to the user of the apparatus the possible presence of a leak which may require repair.

The present invention still further provides a relatively simple and inexpensive pressure test device which allows a user of the control apparatus to readily test for the presence of pressure in a pressure supply line.

The foregoing and other features of the invention are hereinafter fully described and particularly pointed out in the claims, the following description and annexed drawings setting forth in detail certain illustrative embodiments of the invention, these being indicative, however, of but a few of the various ways in which the principles of the invention may be employed.

DETAILED DESCRIPTION OF PREFERRED EMBODIMENTS

Figures 1, 3, 4:
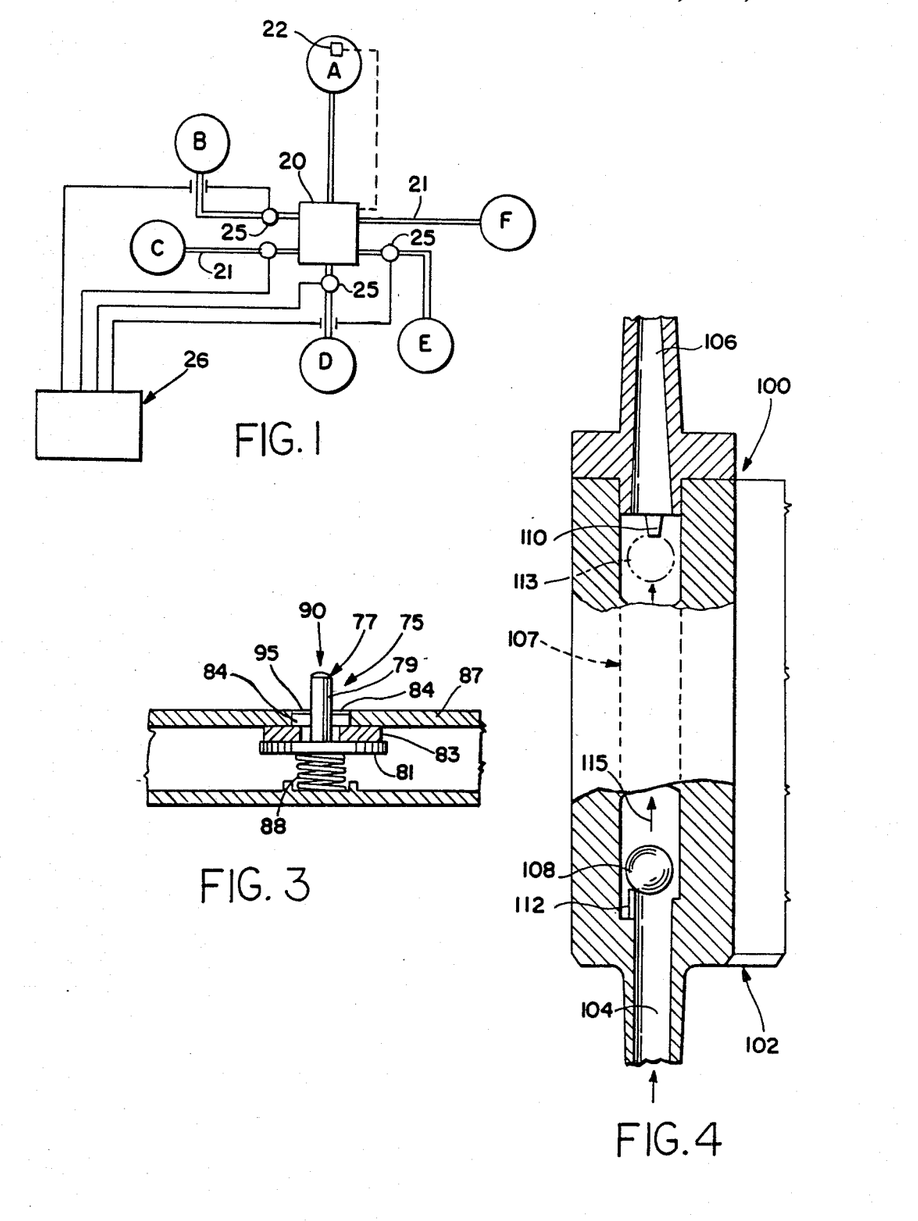
FIG. 1 is a schematic illustration of a central heating/cooling system having installed therein a zone control apparatus.
FIG. 3 is a cross sectional view of the pressure test device schematically illustrated in FIG. 2.
FIG. 4 is a fragmentary cross sectional view of an air flow detection device schematically illustrated in FIG. 2.

As indicated, FIG. 1 is a diagrammatic illustration of a central heating and/or cooling system embodying a zone control apparatus according to the present invention. By way of example, the illustrated heating and/or cooling system includes a central fluid heating and/or cooling plant 20 and conditioned fluid conduits 21 extending from the plant to respective rooms to be heated or cooled by the system. The rooms, or zones which may include one or more rooms or areas, are indicated by circles and differentiated by the letters A–F. In conventional operation of the system, fluid heated or cooled by the plant 20 is directed by the conduits 21 to respective rooms A–F for heating or cooling such rooms. Also in conventional manner, operation of the plant 20 may be controlled by a thermostat 22 located in one of the rooms such as room A. The thermostat may be set to a desired temperature whereupon the system operates automatically to maintain such temperature in the room containing the thermostat, hereinafter the control room. At the same time, the other rooms B–F will be heated or cooled absent any flow restrictions in associated conduits.

The foregoing generic description is generally applicable to various conventional types of central heating and/or cooling systems employed in residential and commercial buildings. In forced air systems, the plant 20 corresponds to a furnace and/or air conditioner, and the conduits 21 to air ducts through which temperature conditioned air is forced to vents or registers opening to the rooms A–F. In hot or cold water systems, the plant 20 corresponds to a water heater or cooler, and the conduits 21 to pipes through which hot or cold water is pumped to heat exchangers located in the rooms A–F. As for steam heating systems, the plant 20 corresponds to a boiler and the conduits 21 to pipes through which steam is directed to radiators located in the rooms A–F.

With further reference to FIG. 1, the zone control apparatus comprises one or more flow control devices 25 operatively associated with respective conduits 21 for controlling flow of conditioned fluid therethrough and a controller 26 for controllably actuating the flow control devices between high and low flow conditions. Each flow control device 25 in its high flow condition allows a high rate of fluid flow from the plant to the associated room for heating or cooling such room. In its low flow condition, each flow control device substantially restricts or preferably shuts off flow of conditioned fluid through the associated conduit thereby to separate or isolate the corresponding room from the plant and hence preclude direct heating or cooling of such room except perhaps by a nominal maintenance amount. That is, the flow control devices for most applications preferably cycle or switch between full open and full closed positions. More specifically, as applied to apparatus that employ bladder type flow control devices, such bladders will cycle or switch between fully inflated and fully deflated modes. Inflation of the bladder results in the restriction of the flow of conditioned fluid in the duct or pipe and conversely the deflation of the bladder results in the free flow of conditioned fluid in the duct or pipe. Consequently, due to such cycling or switching the system will operate to heat or cool the various rooms only during those periods when the fluid control devices associated therewith are in their high flow condition. Preferably, the devices are located in the conduits remote from the rooms and proximate the plant to eliminate heating or cooling losses along the lengths of such conduits. It perhaps should be noted that the rooms when thusly isolated or separated from the system still may be indirectly heated or cooled somewhat by reason of open doors and uninsulated interior walls which permit heat transfer between heated/cooled and unheated/uncooled rooms.

Figure 2:
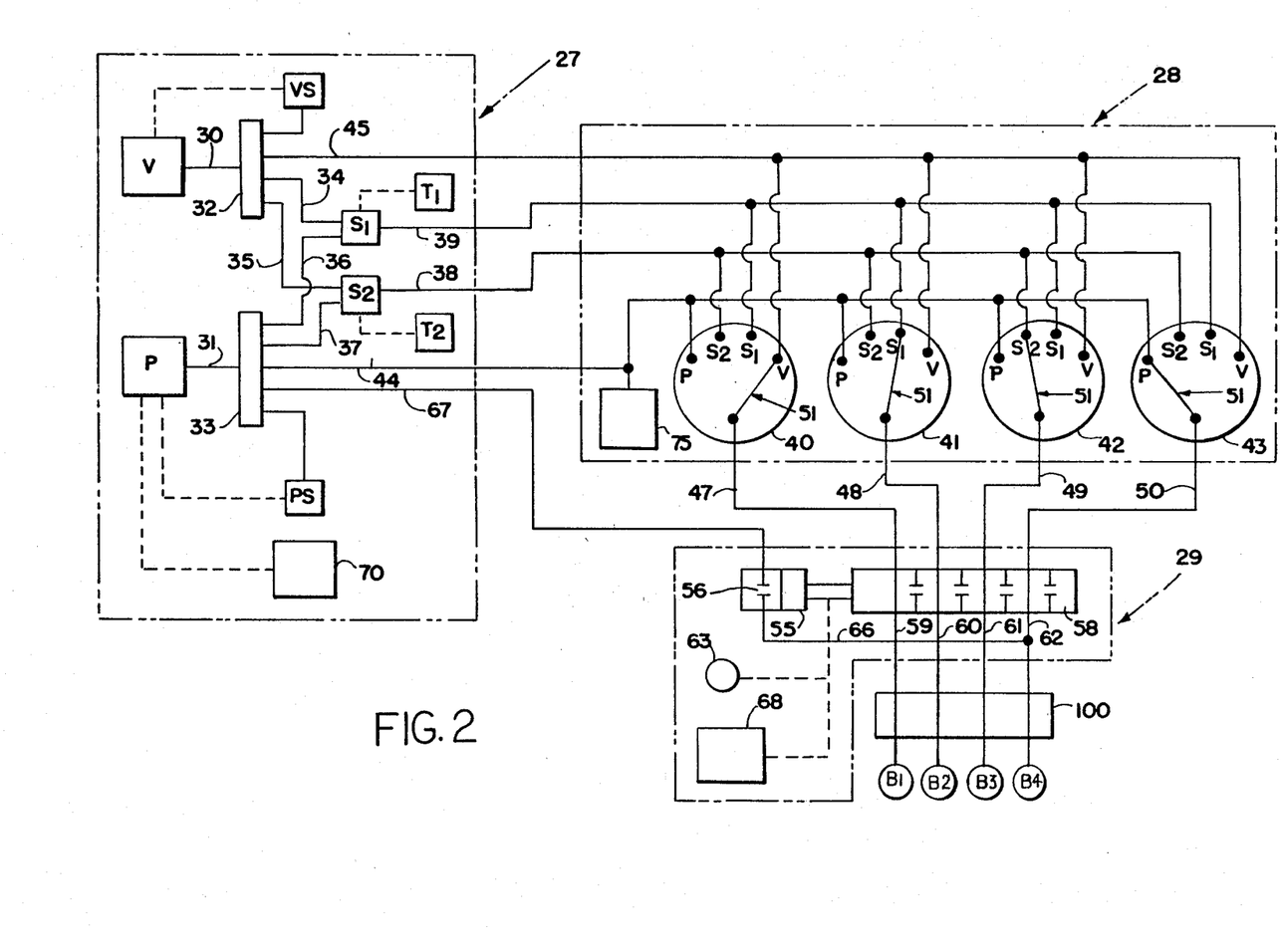
FIG. 2 is a schematic illustration of an improved zone control apparatus according to the present invention.

Referring now to FIG. 2, there is illustrated a schematic of the controller 26. The controller 26 comprises a control module 27, a logic module 28, and a smoke damper module 29. The control module 27 includes a source vacuum and a source of pressure designated respectively V and P. Although the source of vacuum and pressure may be provided by a variety of devices, preferably such devices comprise vibration type diaphragm pumps. The vacuum and pressure pumps may be of identical type, it being appreciated that a vacuum supply line 30 is connected to the inlet of pump V serving as the vacuum source and that a pressure supply line 31 is connected to the outlet of the other pump P serving as the pressure source.

The vacuum pump V and pressure pump P respectively are connected by the supply lines 30 and 31 to a vacuum manifold 32 and a pressure manifold 33. Such manifolds 32 and 33 respectively provide for the equalization of vacuum and pressure within the various lines connected thereto thus helping to avoid excessive pump run time. The pressure in manifold 33 is monitored by pressure switch PS. When the pressure drops below a present level, pressure switch PS senses the drop and activates pressure pump P. When the pressure in manifold 33 increases beyond the same or possibly a higher preset level, pressure switch PS deactivates pressure pump P. The level of vacuum in vacuum manifold 32 is monitored and controlled in a similar manner by vacuum switch VS to restore and maintain vacuum in manifold 32 to or at the present level or within a desired range.

The vacuum manifold 32 has solenoid valves S1 and S2 connected thereto by lines 34 and 35, respectively, whereas the pressure manifold 33 has such solenoid valves S1 and S2 connected thereto by lines 36 and 37, respectively. The solenoid valves S1 and S2 are of any suitable type that can be actuated to connect respective lines 38 and 39 to either a vacuum as supplied by lines 34 and 35, or pressure as supplied by lines 36 and 37. Actuation of solenoid S1 is determined and controlled by timer T1 which may be programmed or preset to actuate solenoid valve S1 at a variety of times. The actuation of solenoid valve S2 is controlled by timer T2 in a like manner. Accordingly, the timers T1 and T2, which also may be referred to as cycle controllers, may operate independently of one another to connect the lines 38 and 39 to the vacuum manifold 32 or pressure manifold 33 at respective preselected times, i.e., in accordance with respective and usually different cycle schedules. For example, the timer T1 may be programmed to provide a day cycle schedule for line 39 and timer T2 may be programmed to provide a night cycle schedule for line 38. As will be appreciated, the timers T1 and T2 may be replaced by a single electronic programmable timer which is capable of imparting separate timing schedules to the solenoid valves.

Lines 38 and 39 are routed to logic module 28. Logic module 28 includes several mode selectors 40, 41, 42 and 43 each of which is connected to a plurality of input lines. Specifically, mode selectors 40, 41, 42 and 43 are connected to pressure line 44 leading from pressure manifold 33, vacuum line 45 leading from vacuum manifold 32, and lines 38 and 39 leading respectively from solenoid valves S2 and S1. Mode selectors 40, 41, 42 and 43 are respectively connected by output lines 47, 48, 49 and 50 to bladders B1, B2, B3 and B4 located in conduits for controlling the flow of conditioned fluid via smoke damper module 29 and indicator 100. Mode selectors 40, 41, 42 and 43 each include a selector switch 51 that provides for the selective connection of output lines 47, 48, 49 and 50 to either the pressure supplied by line 44, the vacuum supplied by line 45, or the vacuum and/or pressure supplied by lines 38 and 39. Thus, by directing the selector switch 51 of mode selector 40 to the vacuum position V, line 47 is connected to line 45 and the bladder B1 deflates allowing for a high flow of conditioned fluid in the bladder's respective conduit. Conversely, by directing the selector switch 51 to the pressure position P, line 47 is connected to line 44 and the bladder B1 inflates providing a low flow of conditioned fluid in its respective conduit. By directing the selector switch 51 to the solenoid S1 position, line 47 is connected to line 39 and the bladder B1 inflates and deflates as determined by solenoid S1 and timer T1. Finally, by directing the selector switch 51 to the solenoid S2 position, line 47 is connected to line 38 and the bladder B1 inflates and deflates as determined by solenoid S2 and Timer T2. Although output line 47 has been illustrated as being connected to only a single bladder B1, it will be appreciated that such output line may be interconnected to a plurality of bladders. With respect to mode selectors 41, 42 and 43, such selectors provide the same operational options for their respective bladders as is provided by selector 40 to bladder B1.

In light of the aforementioned, logic module 28 with its various mode selectors 40, 41, 42 and 43 provides a simple and efficient means of selectively connecting one or more bladders to a vacuum line, a pressure line, and a pair of solenoid control lines. Such selection allows a user to easily and quickly alter the operation of one or more bladders to suit the user's particular schedule and/or needs. For example, in the event an activity schedule, such as a night schedule as provided by timer T1 and solenoid S1, should be temporarily altered for a particular room to correspond to, for example, a day schedule as provided by timer T2 and solenoid S2, such altered activity schedule may easily be accommodated by switching the selector switch of the appropriate mode selector which controls the bladder in the conduit which provides conditioned fluid to that room from the night schedule or S1 position to the day schedule or S2 position. When the activity schedule for that same room returns to normal, the selector switch may easily be returned to its original position causing the bladder in the conduit which provides conditioned fluid to such room to once again automatically cycle according to the night cycle schedule.

Although the details of the mode selectors and corresponding selector switches have not been addressed, it will be obvious to one skilled in the art that any one of a variety of devices may be employed. For example, such mode selectors may merely comprise a four position mechanical valve that allows a user of the system to select any one of the four positions. Alternatively, the mode selectors may comprise a plurality of electrically controlled solenoid valves and switches which selectively interconnect lines 47, 48, 49 and 50 to lines 38, 39, 44 and 45.

With further reference to FIG. 2, the zone control apparatus further includes a smoke damper module 29 having particular use with HVAC systems. The damper module 29 comprises a combination electric solenoid 55 and valve 56, and a mechanical valve 58 to which lines 47, 48, 49 and 50 are connected at the input thereof. Connected to the output of valve 58 are lines 59, 60, 61 and 62 which are respectively connected to bladders B1, B2, B3 and B4 via indicator 100. Valve 58 may be advanced through one of two positions by solenoid 55. One position, the open position, allows the flow of air between lines 47, 48, 49 and 50 and respective lines 59, 60, 61 and 62, while the other position, or closed position, restricts or shuts off the flow of air between such lines. Normally valve 56 is in the closed position restricting flow from line 67 to line 66. However, when the solenoid 55 is actuated to close valve 58, valve 56 is simultaneously opened by solenoid 55 causing pressure line 67 to connect with line 66 which is in turn connected to lines 59, 60, 61 and 62.

Solenoid 55 is controlled and actuated by smoke detector 68. Thus, in the event of a fire, such fire is detected by smoke detector 68 which automatically sends a signal to solenoid 55 causing valve 58 to close and valve 56 to connect lines 67 and 66. Then, line 66 directs pressure from line 67 to lines 59, 60, 61 and 62 causing bladders B1, B2, B3 and B4 to inflate and provide a low flow condition in their respective conduits. Thus, the smoke detector 68 provides for the automatic inflation of the bladders B1, B2, B3 and B4 regardless of the selected position or operating mode of the bladder's respective mode selector. In an HVAC system, the inflation of the bladders in the conduits in which they are located results in the restriction of air flow, preferably a hermetic seal shutting off flow completely, in such conduits helping to prevent smoke contamination from passing from zone-to-zone through the duct system and to avoid the creation of a "chimney" effect in the duct system.

It will be appreciated that smoke detector 68, which may include one or more smoke detecting devices, heat detecting devices and/or other fire detecting devices may be located at one or more locations within a residence or commercial building including within the main return duct of the HVAC system. It will be further appreciated that the damper module 29 may be readily adapted to control any number of bladders, including even bladders or flow control devices of another zone control apparatus including its own pressure source, vacuum source, logic module, etc., and that it is in no way intended to be restricted to the control of only four bladders as illustrated.

In addition to the automatic activation of the damper system by smoke detector 68, the damper module 29 may be provided with an override switch 63. Activation of such switch by the user of the damper module 29, like the activation by detector 68, also accomplishes the inflation of the bladders irrespective of the selected position or operating mode of mode selectors 40, 41, 42 and 43. The override switch 63 may be a single switch or a plurality of switches strategically located within the protected building for emergency operation of the damper module 29. Upon actuation of the damper module 29, the bladders preferably close off the ducts in which they are located to prevent spreading of smoke through the duct system. The smoke detector 68 also may be used to shut down the HVAC system in response to detection of smoke further to prevent the spread of fire and smoke.

Although the smoke damper module 29 has been described in conjunction with a flow control apparatus which employs fluid actuated flow control devices (bladder devices preferred), it will be appreciated that this invention contemplates a smoke damper module which may also be used in conjunction with electrical, mechanical, or other non-fluid actuated flow control devices. Such a smoke damper module would act, upon either manual activation or automatic activation by a smoke detector, to cause the flow control devices to provide a low flow (preferably no flow) condition of conditioned fluid in their respective conduits.

Various means may be employed for resetting the smoke damper module for normal operation of the system. Preferably such means require human intervention to determine that the fire and/or smoke hazard no longer exists. For example, the solenoid actuated valves 56 and 58 may be of such type that once the solenoid 55 has moved them from their normal operating mode to their actuated mode blocking lines 47, 48, 49 and 50 and connecting lines 67 and 68, the solenoid valves remain in their actuated state until such time that they are manually moved back to their normal condition such as by depressing a plunger connected to the spool or spools of such valves.

As illustrated, line 66 receives pressure via line 67 from the pressure manifold 33 which is supplied pressure by the apparatus' main pressure source pump P. Note, pump P is provided with an emergency or back-up power source 70, such as a battery, in the event the pump's main source of energy supply is extinguished. In addition to an alternative energy source 70, it will be appreciated that the apparatus may simply employ a back-up source of pressure such as a tank of $CO_2$ gas or a second battery operated compressor.

Also illustrated in FIG. 2 is a pressure test device 75 made in accordance with the teachings of the present invention. Device 75, which is connected to pressure line 44, is utilized by the user of the apparatus to determine whether there is sufficient operating pressure present in line 44. FIG. 3 is a cross sectional view of the device 75 which more clearly illustrates its means of operation. The device 75 comprises a valve stem 77 having a shank 79, a flange 81, a seal 83 and a pair of shank supports 84 which only partially restrict opening 95 in wall 87. In the resting position the seal 83 is held against inner wall 87 of line 44 by spring 88 which prevents the escape of pressurized air contained in line 44. When a user depresses the shank 79 in the direction indicated by arrow 90, seal 83 becomes unseated allowing the escape of pressurized air contained within line 44. A brisk and continuous flow of air out of the opening 95, which is only partially restricted by shank supports 84, indicates an adequate supply of pressurized air for the control apparatus.

Alternatively, the valve 77 may be biased to an open position and normally held closed by pressure in line 44. However, when the pressure drops below the value needed to hold the valve closed against the biasing force, the valve will move inwardly to provide an audible and/or visual indication of insufficient pressure. The audible indication is provided by the sound of pressurized air escaping through the valve and the visual indication is provided by the shank 79 being retracted with respect to inner wall 87. The biasing force may be selected to provide for the visual and/or audible indication at a desired minimum operating pressure in line 44.

Also schematically shown in FIG. 2 is a transparent flow indicator 100 which is connected to the lines 59, 60, 61 and 62. A fragmentary cross sectional view of the indicator is shown in FIG. 4. The indicator 100 comprises a plurality of chambers, one of which is illustrated and designated 102. Chamber 102, which is connected to line 59 (not illustrated), is preferably constructed of a transparent plastic material. The chamber comprises an inlet port 104, which would be connected closest to the mode selector, and an outlet port 106 which would be connected closest to the bladder. Contained within the open channel 107 formed in chamber 102 is a spherical lightweight plastic ball 108. The indicator 100 should always be oriented such that when no air or fluid is flowing within channel 107, the ball 108 is pulled towards inlet 104 by gravity. The outlet 106 includes a protruding tab 110 which only partially restricts outlet 106 and prevents the ball from entering and plugging the outlet 106. Similarly, the inlet 104 also includes a tab 112 which only partially restricts inlet 104 and prevents the plugging thereof.

The operation of the indicator 100 is quite simple. As a bladder is being pressurized, the ball 108 jumps upward as indicated generally by arrow 115 and phantom ball 113 due to the fluid or air flowing through channel 107. When the flow of fluid stops, gravity returns ball 108 to its lowest or resting position as shown. Thus, if the ball 108 continues to jump long after the particular bladder interconnected in series with the chamber 102 should be inflated, such jumping signals the presence of a leak in the bladder or the line going thereto, requiring immediate repair. Although the indicator 100 has been shown spliced into the bladder inlet lines, it will be appreciated that such indicators may be placed throughout the apparatus to signal the presence of leaks.

Figure 5:
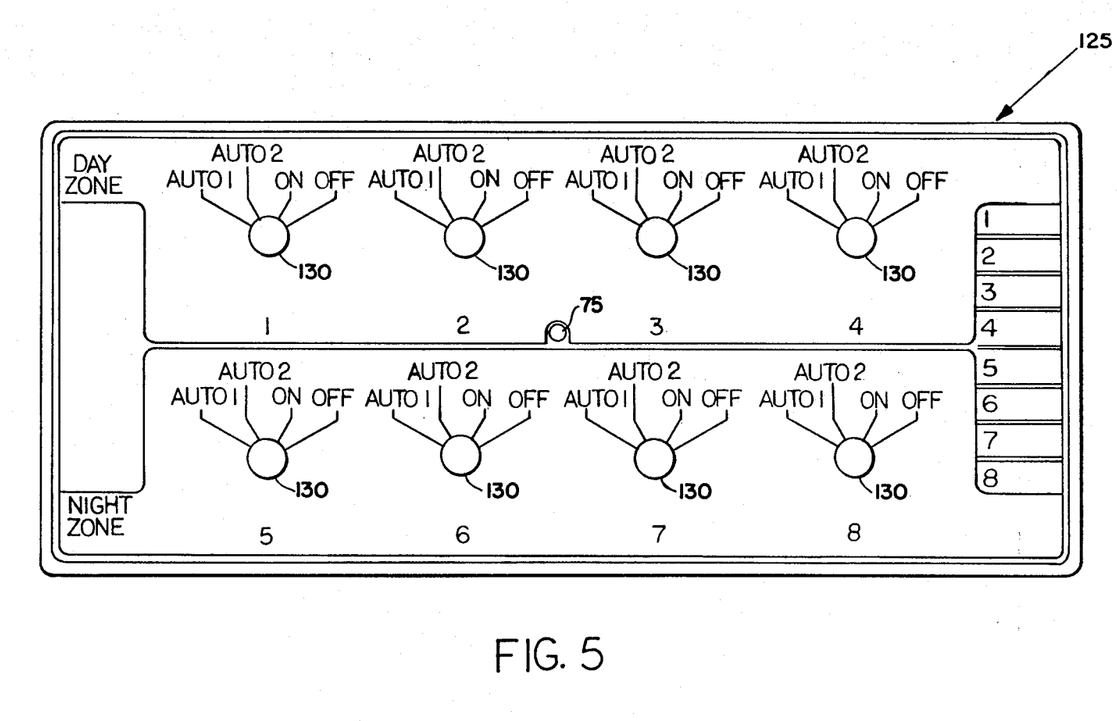
FIG. 5 is a front view of a logic module control panel having mounted thereon a plurality of mode selectors.

Referring now to FIG. 5 there is illustrated a logic module control panel 125 for use in conjunction with the present invention having a plurality of mode selectors labeled 1–8 and a pressure test device 75 integrally molded therein. Selectors 1–4 being grouped into a day zone or day activity cycle schedule, and selectors 5–8 being grouped into a night zone or night activity schedule. Such grouping suggests to a user of the apparatus the normal mode of operation to which a particular group of mode selectors is to be positioned in. Although eight selectors are illustrated, it will be appreciated that a control module may be provided having any number of mode selectors and such selectors may be grouped in any variety of manners besides simply night and day zones.

Each selector, like the selectors previously illustrated in FIG. 2, includes a four position selector switch 130. Each switch 130 may be selected to any one of four positions, "auto 1", "auto 2", "on" and "off". Selection of the "on" position causes the bladders to interconnect directly with the source of vacuum, causing such bladders to deflate providing a high flow of conditioned fluid in the bladders' respective fluid conduit. Selection of the "off" position causes the bladders to interconnect directly to a source of pressure causing the bladders to inflate providing a low flow of conditioned fluid in the bladders' respective conduits. Selection of the "auto 1"

position causes the bladders controlled by such selectors to cycle automatically according to the day zone activity schedule. Finally, selection of the "auto 2" position causes the bladders controlled by such selectors to cycle automatically according to the night activity schedule. Although mode selectors having four positions have been illustrated, it will be appreciated that a control panel may be constructed having for example eight mode selectors with only three positions each. Specifically, day group selectors 1-4 may be provided with "Auto 1", "Off" and "On" position, and night group selectors provided with "Auto 2", "Off", and "On" positions. Similarly, it will be appreciated that a more complex panel may be constructed having mode selectors with a variety of "Auto" positions each of which provides a distinctly different mode of operation.

Generally, the logic module control panel 125 is conveniently located in the room of the residence or commercial building which includes the heating/cooling system's thermostat. Furthermore, the control module 27 and its associated elements are also generally located near the heating/cooling plant. Note, however, it will be appreciated that both the logic module control panel 125 and the control module 27 may be located essentially anywhere within a residence, commercial building, or the like.

It will be appreciated that although in the majority of the above description of the invention of a bladder type flow control device has been referred to, the principles of this invention are equally applicable to zone control apparatus that employ any type of fluid actuated flow control device. Furthermore, it will be appreciated that in addition to air, a variety of fluids such as water, $CO_2$, oil and the like may be used to actuate flow control devices.

Features of the invention also may be adapted for uses other than those specifically mentioned. For example, basic principles of the invention may be applied to shut-off flow to leaking pipes or components of a system employing conditioned media such as water or steam. Such flow may be shut-off in response to a condition indicative of the leak such as an unusual pressure loss in a pipe. With reference to FIG. 2, sensor 68 may be a suitable sensor responsive to fluid pressure or, more particularly, a drop in fluid pressure below a predetermined amount in system components associated with water/steam pipes in which bladders B1, B2, B3, B4 are mounted. When activated, the sensor may cause pressure to be supplied to the bladders thereby to shut-off flow through the water/steam pipes and consequently prevent fluid leakage downstream of the bladders. As will be appreciated, the bladders may be independently actuated by respective sensors respectively associated with the water/steam pipes in which the bladders are mounted for shut-down of only that part of the overall system in which a leak condition has been sensed while the remainder of the system remains operative.

Although the invention has been shown and described with respect to preferred embodiments, it is obvious that equivalent alterations and modifications will occur to others skilled in the art upon the reading and understanding of the specification. The present invention includes all such equivalent alterations and modifications, and is limited only by the scope of the following claims.

We claim:

1. In combination with a central heating and/or cooling system having a source of conditioned air and respective ducts for directing the conditioned air to respective zones for conditioning the environment therein, flow control means for controllably restricting flow of conditioned air through at least one of said ducts, means for normally actuating said flow control means between high and low flow conditions, fire detecting means for detecting the existence of fire in at least one of said zones, and override means responsive to said fire detecting means for disabling said means for normally actuating and for actuating said flow control means to a low flow condition.

2. The combination of claim 1, wherein said flow control means includes a fluid expandable bladder positioned in said one of said ducts for closing the duct when expanded and thereby actuated to a low flow condition.

3. The combination of claim 1, including plural flow control means for controlling flow of conditioned air through respective ducts.

4. The combination of claim 3, including means for simultaneously disabling actuation of flow control means by said means for normally actuating and for actuating said flow control means to a low flow condition.

5. The combination of claim 4, wherein at least one of said flow control means includes a fluid expandable bladder positioned in a respective one of said ducts for closing off the duct when expanded and thereby actuated to a low flow condition.

6. In combination with a central heating and/or cooling system having a source of conditioned air and respective ducts for directing the conditioned air to respective zones for conditioning the environment therein, plural flow control means for controllably restricting flow of conditioned air through respective ducts, means for normally actuating said plural flow control means between high and low flow conditions independently of flow of conditioned air through the respective ducts and at least one independently of another, and means for simultaneously disabling actuation of said flow control means by said means for normally actuating and for actuating said flow control means to a low flow condition.

7. The combination of claim 6, wherein at least one of said flow control means includes a fluid expandable bladder positioned in a respective one of said ducts for closing off the duct when expanded and thereby actuated to a low flow condition.

8. The combination of claim 6, including fire detecting means for detecting the existence of fire in at least one of said zones, and wherein said means for simultaneously disabling is responsive to said fire detecting means for disabling said means for normally actuating and for actuating said flow control means to a low flow condition.

9. The combination of claim 8, wherein at least one of said flow control means includes a fluid expandable bladder positioned in a respective one of said ducts for closing off the duct when expanded and thereby actuated to a low flow condition.

10. In combination with a central heating and/or cooling system having a source of conditioned air and respective ducts for directing the conditioned air to respective zones for conditioning the environment therein, plural flow control means for controlling flow of conditioned air through respective ducts, means for normally actuating said plural flow control means between high and low flow conditions at least one independently of another, and means for simultaneously disabling actuation of said flow control means by said means for normally actuating and for actuating said flow control means to a low flow condition, and wherein said flow control means are fluidically actuated, and said means for simultaneously disabling includes switch means for simultaneously connecting said flow control means to a source of fluid pressure.

11. The combination of claim 10, wherein said source of fluid pressure is a pressure pump.

12. The combination of claim 10, wherein said source of pressure is a container of pressurized fluid.

13. In combination with a central heating and/or cooling system having a source of conditioned air and respective ducts for directing the conditioned air to respective zones for conditioning the environment therein, plural flow control means for controlling flow of conditioned air through respective ducts, means for normally actuating said plural flow control means between high and low flow conditions, fire detecting means for detecting the existence of fire in at least one of said zones, and override means responsive to said fire detecting means for disabling said means for normally actuating and for actuating said flow control means to a low flow condition, said override means including means for simultaneously disabling actuation of said plural flow control means by said means for normally actuating and for actuating said flow control means to a low flow condition, said plural flow control means being fluidically actuated, and said means for simultaneously disabling including switch means for simultaneously connecting said flow control means to a source of fluid pressure.

14. The combination of claim 13, wherein said source of fluid pressure is a pressure pump.

15. The combination of claim 13, wherein said source of pressure is a container of pressurized fluid.

* * * * *